United States Patent [19]

DeLillo

[11] Patent Number: 5,441,552
[45] Date of Patent: Aug. 15, 1995

[54] METHOD AND APPARATUS FOR COMPOSTING SOLID WASTE AND SLUDGE

[76] Inventor: Joseph DeLillo, 4272 Royal Oak Dr., Palm Beach Gardens, Fla. 33410

[21] Appl. No.: 144,296

[22] Filed: Oct. 27, 1993

Related U.S. Application Data

[63] Continuation of Ser. No. 799,373, Nov. 27, 1991, abandoned.

[51] Int. Cl.[6] .............................................. C05F 9/04
[52] U.S. Cl. ............................................ 71/9; 71/12; 71/901
[58] Field of Search .................... 71/9, 10, 12, 13, 901; 47/17

[56] References Cited

U.S. PATENT DOCUMENTS

| | | | |
|---|---|---|---|
| 3,285,732 | 11/1966 | Schulze | 71/9 |
| 3,579,320 | 5/1971 | Pesses | 71/901 |
| 3,654,903 | 4/1972 | Montgomery | 47/17 |
| 4,050,917 | 9/1977 | Varro | 71/901 |
| 4,352,888 | 10/1982 | Tisbo et al. | 71/9 |
| 4,483,704 | 11/1984 | Easter, II | 71/9 |
| 4,567,690 | 2/1986 | Murrell | 47/17 |
| 4,874,134 | 10/1989 | Wiens | 241/19 |
| 4,956,002 | 9/1990 | Egarion | 71/901 |

FOREIGN PATENT DOCUMENTS

| | | | |
|---|---|---|---|
| 0393212 | 10/1990 | European Pat. Off. | 71/9 |
| 3736889 | 6/1988 | Germany | 71/9 |
| 4111204 | 10/1992 | Germany | 71/9 |

*Primary Examiner*—Ferris Lander
*Attorney, Agent, or Firm*—McHale & Slavin

[57] ABSTRACT

A method and apparatus for composting solid waste and sludge into a usable state. The method consists of thoroughly mixing a predetermined amount of compostable solid waste and sludge for placement within a stackable modular container system. Each container having a predetermined controlled mixture depth of approximately 12 inches for composting in a fourteen day period. Upon removal of the composted material from the containers, the material is screened and packaged for distribution, or shredded then screened and packaged, the remainder of which is returned for repeat of the cycle.

13 Claims, 5 Drawing Sheets

METHOD AND APPARATUS FOR COMPOSTING SOLID WASTE AND SLUDGE

This is a continuation of my patent application Ser. No. 07/799,373, filed Nov. 27, 1991, now abandoned.

FIELD OF THE INVENTION

This invention relates generally to the field of solid waste and sludge treatment, and, more particularly, to a method of composting solid waste with dewatered sludge in approximately 14 days by use of a modular composting container apparatus.

BACKGROUND OF THE INVENTION

Disposal of solid waste is a nationally recognized problem. Conventionally, solid waste is placed into a ground void more commonly referred to as a land fill. Most land fills are nothing more than a dumping ground for non-separated waste including plastics, aluminum, glass and other none bio-degradable matter, consuming valuable space. Some land fills are designed to "compost" organic matter over a period of time by creating a digestive environment. Despite the type of land fill employed, in the United States it is well known that the rapid increase in general population produces waste at a level that exceeds the capacity of present land fills. The current state of land fills is best described as critical, with the prediction that all existing land fills will be filled before the turn of the century.

New sites for land fills are limited. The general population has expanded at such a rate that land once thought available for use a land fill may now be surrounded, if not covered, by housing. Further, the continuing awareness of ground water contamination, methane gas production, decreased property values, and general pollution resulting from land fills requires each proposed site to undergo extensive debate as well as meet strict environmental standards.

In response to these problems, incineration of waste has gained limited acceptance, but the associated air pollution constitutes a major drawback. In addition, the by-product of incineration consists of ash that is typically considered a hazardous waste. Recycling is an effective alternative in lessening the proportion of bio-degradable material placed in land fills, and is now required by law in some areas. Composting of waste is also a viable alternative to conventional dumping with variations using some forms of incineration, recycling, and composting being the subject of numerous patents.

Composting systems use aerobic mixing to control composting parameters such as pH, moisture content, temperature, and oxygen levels of a compost mixture. Typically, composting is carried out in economical windrow piles. However, the windrow is a static pile of non-uniform depth, does not provide uniform composting, and requires undesirably large sections of land.

The temperature distribution at the surface of the pile is significantly less than the temperatures at the center of the pile. The windrow is spread across a length of land and if the pile is high in leachables, such as nitrates, the pile may lead to ground water contamination.

Composting by windrow requires mixing for aeration. A "SCARAB" machine is commonly used to straddle the pile to fluff and aerate the compost. If the mixing is performed infrequently, the pile can produce a severe odor problem from anaerobic pockets. Frequent mixing destroys digestion and further increases the spore levels around the pile. Conventional practice requires a windrow to undergo a 30 to 45 day aeration/non-aeration curing period when mixing is employed.

What is needed in the art is a method and apparatus which effectively accomplishes composting over a short period of time without utilization of expensive real estate, equipment, or require a high operational expense. One attempt at addressing this issue is disclosed in U.S. Pat. No. 4,956,002 issued to Egarian regarding a process for composting organic waste utilizing modular containers. Each container is placed side by side, interconnected, each dependent upon the other for the process. Extensive monitoring is required to determine the progress of the composting.

U.S. Pat. No. 4,483,704 issued to Easter discloses a method of composting sludge employing the use of a silo. Treated sludge is placed at the top of the silo while composted material is withdrawn from the bottom of the silo. The process simply moves the sludge from the top to the bottom of the silo, the composting process taking place therebetween.

The prior art does not teach a method of composting which can effectively be completed for certain of the waste material over approximately 14 days by vertical stacking of modular containers, nor does the prior art teach a method or apparatus allowing composting without forced aeration, mixing, or elaborate monitoring controls. It is to the effective resolution of the aforementioned problems that the method and apparatus of the instant invention is directed.

SUMMARY OF THE INVENTION

It is a principal object of the present invention to provide an apparatus that overcomes the shortcomings and associated problems described above by providing a method of treating waste, which, when used in combination with a modular container apparatus of the instant invention, provides a means for efficiently composting waste and sludge in approximately 14 days.

Generally, the process for treating solid waste and dried sludge comprises the steps of: manually sorting municipal solid waste for removal of non-compostable matter, providing, analyzing and adjusting a sludge and adding a predetermined amount thereof to the solid waste, mixing the solid waste and sludge thoroughly, depositing the mixture in a plurality of stackable modular containers, each having an aerated bottom and an open top, maintaining the depth of the mixture between 5 and 15 inches, stacking the containers in a controlled environment in vertical disposition, monitoring the mixture within the controlled environment, allowing the mixture to digest for approximately 14 days, removing the mixture from the containers, screening composted material from the mixture, removing composted material for packaging or bulk distribution, shredding any remaining non-thoroughly composted mixture, screening from the remaining mixture any non-compostable material for placement in packaging or bulk distribution, and returning any remaining waste material to the municipal solid waste supply to be reprocessed through the composting process.

Therefore, it is an object of the instant system to specifically arrange components providing an efficient method for preparing solid waste and sludge material for composting.

Yet another object of the instant invention is to provide a method for making a commercially useful compost mixture from selected waste products, such as landscaping, and agricultural use, or for use in soil enhancements that are enchanced by nutrient matter.

Still another object of the instant invention is to provide a modular container system having a means for vertical stacking and interlocking.

Yet still another object is to provide a method and apparatus for carrying out aerobic composting in a 14 day cycle.

Still another object of the process is to provide a method of composting for existing land fills whereby utilization of the instant method, with or without removal of non-compostable wastes, provides an aerobic environment and decreases the volume demand in a conventional landfill.

Other and further objects, features, and advantages of the invention will become evident upon the reading of the following specification taken in conjunction with the drawings.

DETAILED DESCRIPTION OF THE INVENTION

As required, detailed embodiments of the present invention are disclosed herein. However, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
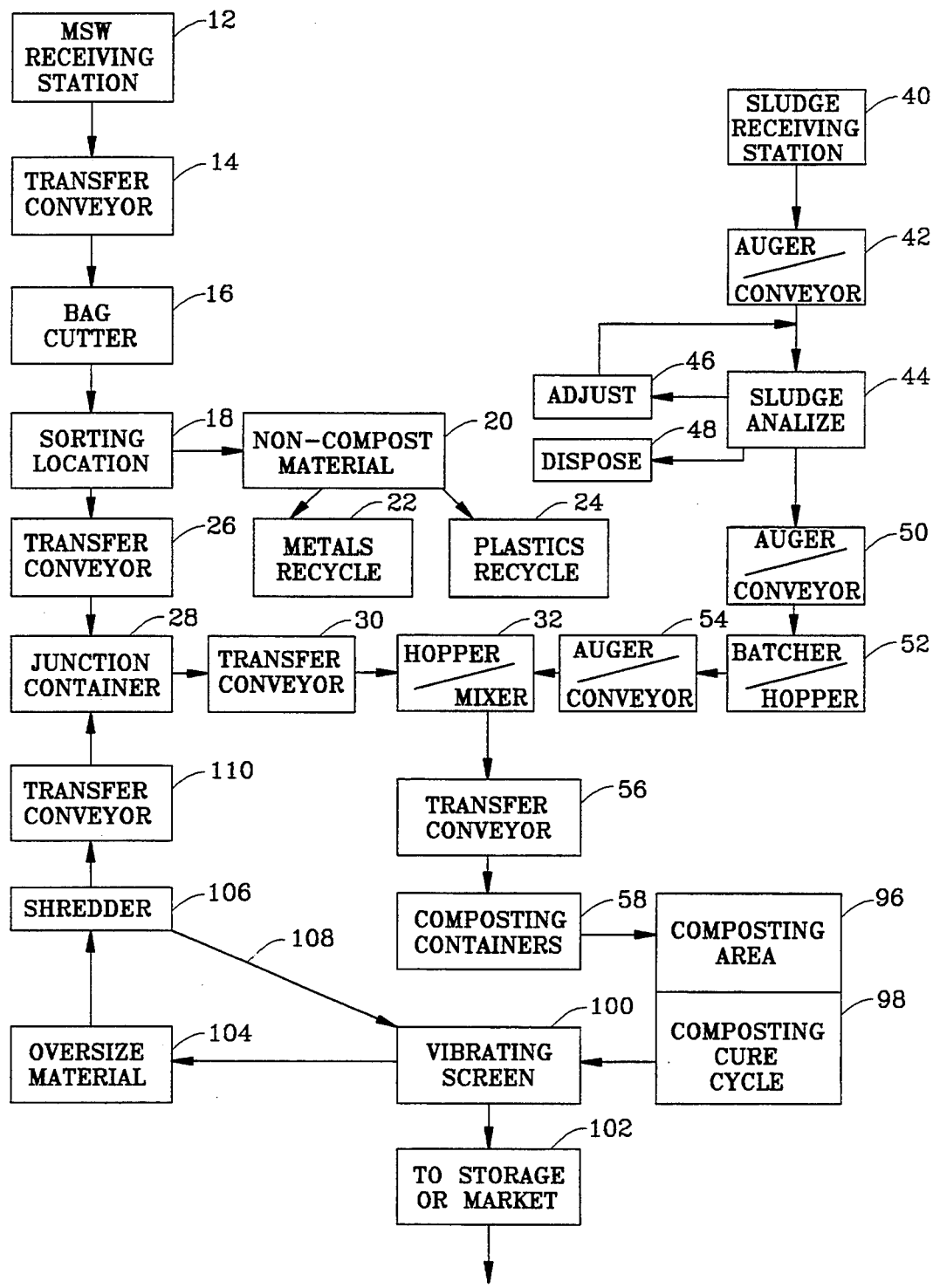
FIG. 1 is a schematic flow chart in accordance with the method of treating and composting waste.
Figure 2:
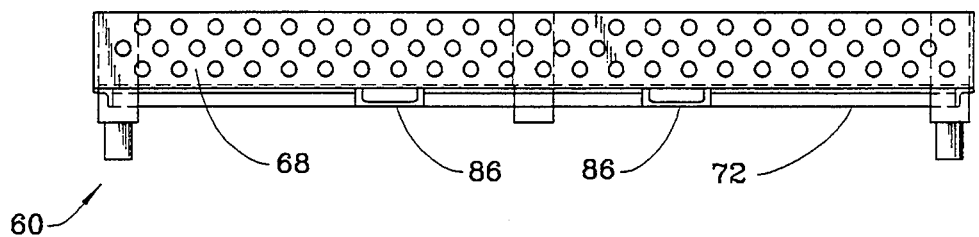
FIG. 2 is a side view of a composting container.
Figure 3:
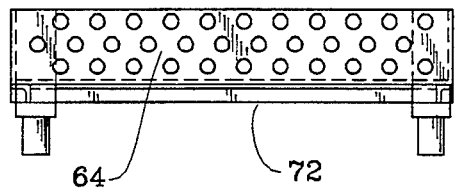
FIG. 3 is an end view of the composting container.
Figure 5:
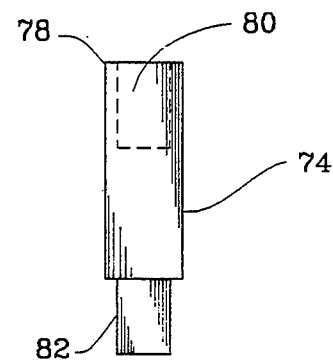
FIG. 5 is an enlarged view of a corner support and interlocking socket of a composting container.
Figure 4:
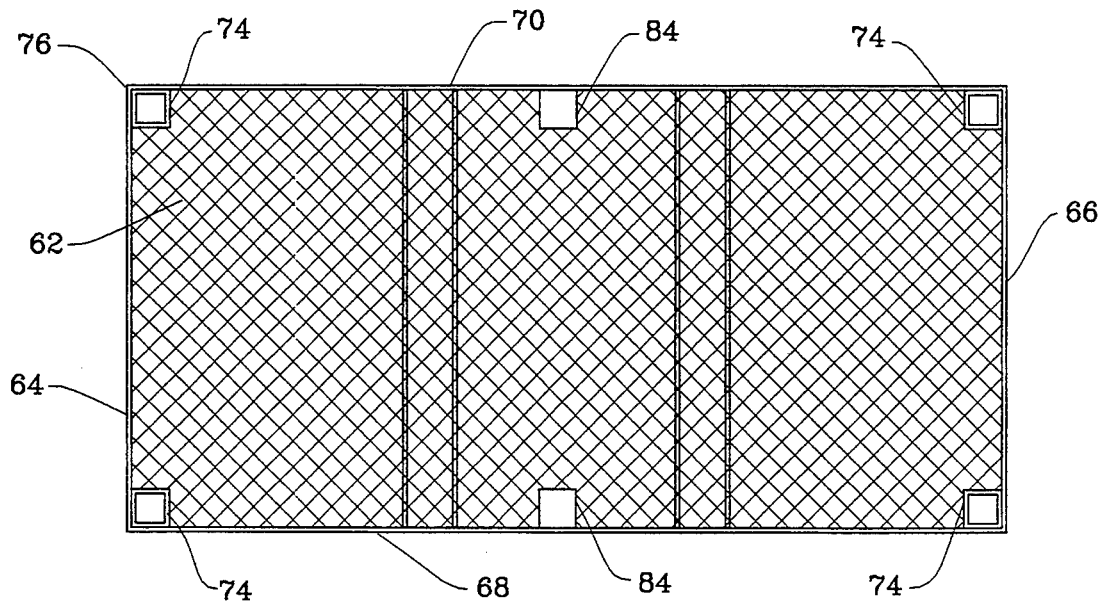
FIG. 4 is a top view of the composting container.

Referring to the drawings in more detail, FIG. 1 illustrates one embodiment of the instant invention whereby a conventional receiving hopper 12 is depicted for receipt of solid municipal waste. Alternatively, the hopper can be a placement station for receipt of waste directly from a dumpster, front end loader, or the like for larger treatment plants. The process as described is designed to handle materials typical of a municipality that does not adhere to a recycling program, however, it will be obvious that use of my invention is conjunction with a recycling program will require essentially the same steps asset forth and will not defeat the object of the invention.

A conveyor 14 carries the waste to a conventional bag cutter 16 for exposing the contents of garbage bags before sorting section 18, where manual labor and automated equipment, such as magnetic sorters, may be employed to sort the waste by removal of non-composting material 20. Typically, a majority of the non-composting material is composed of recyclable materials such as plastics, glass, batteries, aluminum, ferrous metals, and so forth. By placement of recycle bins near the sorting location, the non-composting materials 20 can be placed into their respective bins such as metal recycling bin 22, plastic recycling bin 24, and so forth. In some instances, the recycling material is not recycled and can be used to from bulk material in the compost as later described.

The waste material is transferred by conveyor 26 to junction container 28 having a means for batching associated therewith. The means for batching is adapted batch, or mix, sorted municipal solid waste with material which has already undergone the full composting process but which was not thoroughly composted. The batching can be carried out by weight or by volume for controlled transfer by conveyor 30 to hopper/mixer 32. Batching can also be carried out through use of an auger which is capable of transferring a predetermined amount of waste based upon the size of the auger and made adjustable by the rotational speed of the internal screw transfer mechanism.

Similarly, municipal dewatered sludge, preferably but not by way of limitation having a moisture content of less than 60% from waste treatment plants, is received in hopper or placement station 40. Conveyor 42 transfers the sludge during which time the sludge can be analyzed 44 and adjusted to be made compatible with the type of compost desired. The waste can be adjusted during transfer or diverted for adjustment 46 or disposal 48. Acceptable sludge is transferred by conveyor section 50 to batcher 52 having a means for batching, or mixing, a predetermined amount of sludge in a manner similar to the means for batching solid waste earlier described. The sludge is then transferred by conveyor 54 to hopper/mixer 32. Alternatively, hopper/mixer can receive a controlled transfer of sludge from receiving station 40 by use of a directly coupled auger such as auger 54. The hopper/mixer 32 includes a means to thoroughly mix the predetermined amount of waste and sludge constituents before transfer by conveyor 56 to modular composting container system 58.

Referring to FIGS. 2-5, the modular composting container system 58 is comprised of a plurality of self-contained stackable containers 60 having a uniformity of design for holding a predetermined amount of mixed waste material. Each container is constructed of preferably a 6 foot by 12 foot rectilinear aeration base 62 having first and second end walls 64, 66 respectively, and first and second side walls 68, 70, respectively. It should be noted that container size can be of any commercially acceptable size without departing from the scope of this invention. Preferred construction material of said walls is aluminum, but any material resistant to corrosion, such as plastic or stainless steel may be used. The end and side walls can be permanently attached, releasably connected, or eliminated. The walls allow additional compost volume to be placed in each container and avoid spillage but are not necessary for the purposes of this invention. The aeration base 62 can be described as a grate defining a plurality of spaced openings therein. The base 62 can be constructed of metal, plastic, fiberglass, or the like material. Additionally, the base 62 may be manufactured from wood, which has a limited life, acceptable for "bulk fill" for composting if repeated use causes the grate to become non functional.

A lower support structure 72 provides structural rigidity to the aeration base 62 consisting of a horizontally disposed brace such as angle iron or comparable structural support attached to the perimeter of the aeration base 62. Corner support is provided by rigid supports 74 logistically positioned in each corner 76. The corner support structure 74 is preferable made of 4 inch box steel, having a minimum wall thickness of ¼ inch. The top end 78 of the corner support 74 of the container 60 includes a hollow portion 80 for stacking purposes. The bottom portion 82 extending below the aeration base 62 allows insertion into the support structure 74 of corresponding legs of other containers 60 thereby interlocking said containers to prevent movement brought about by seismic shifting or the like. It should be noted that the interlocking feature is not essential to the proper functioning of my system in areas not subject to seismic shifting. For added strength, each corner support 74 can be partially filled with a fluid such as cement or constructed of preformed structural steel.

Figure 6:
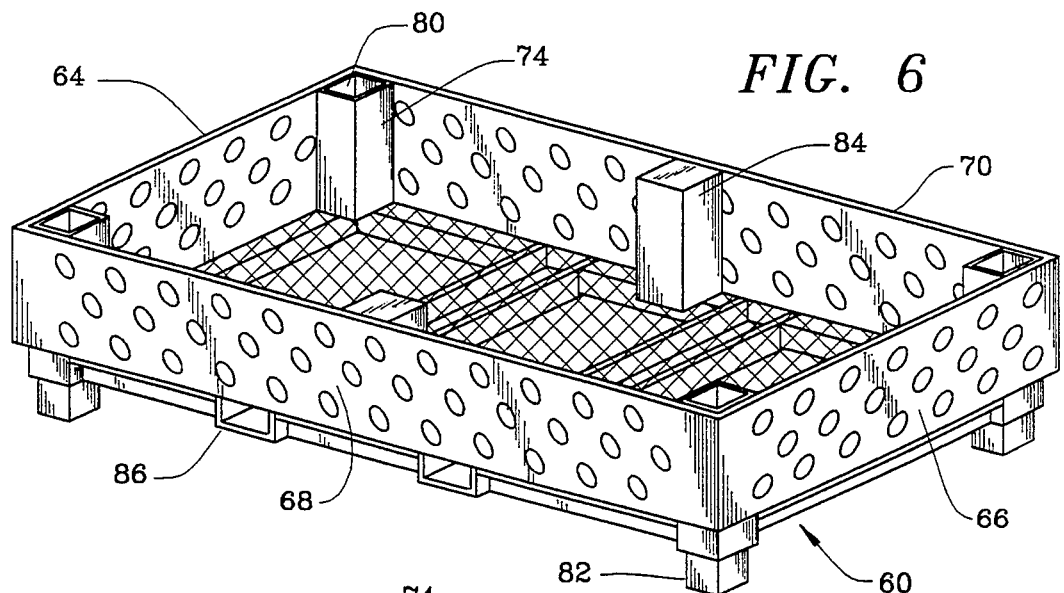
FIG. 6 is a perspective view of the composting container.
Figure 7:
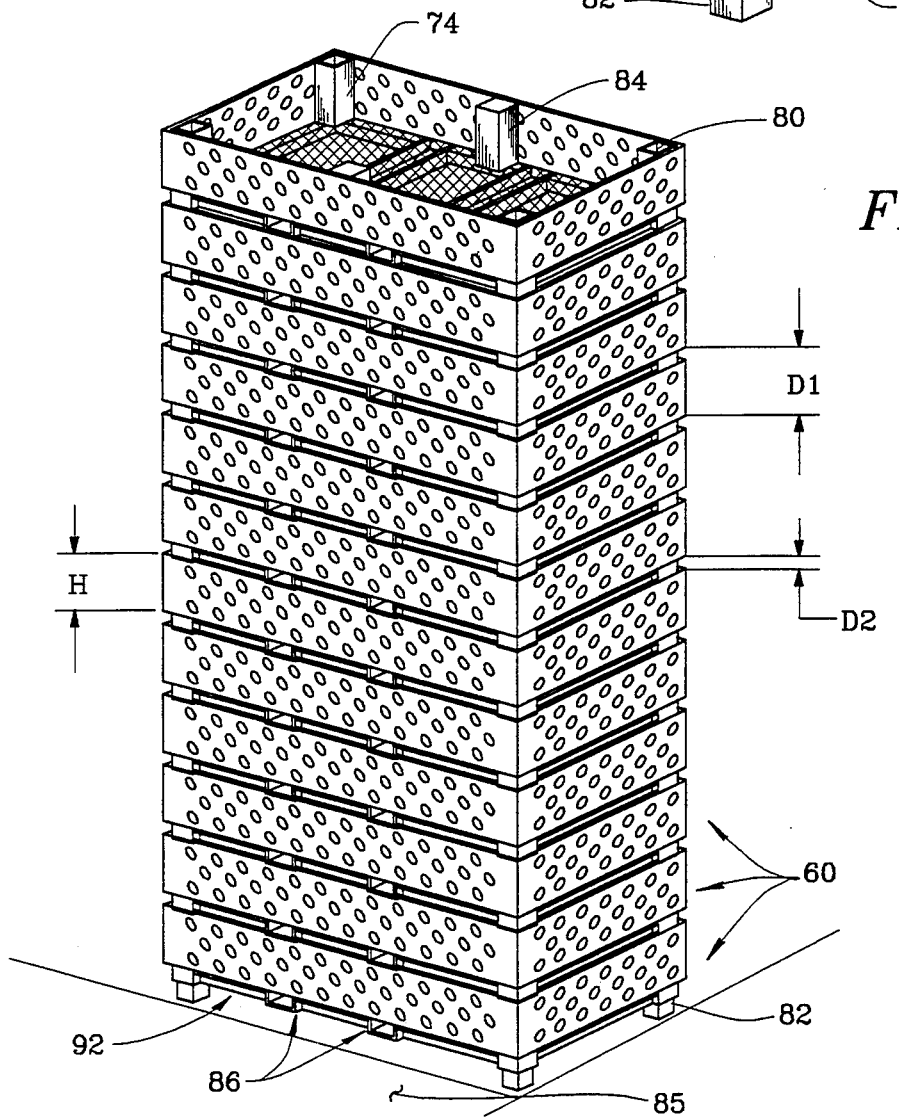
FIG. 7 is a perspective view of a plurality of modular composting containers in stacked arrangement.

Referring to FIGS. 6 and 7, a prospective view is shown of the composting container with center support 84, similar to corner support 74, void of the insertion means. The top portion and bottom portion can be substantially flat providing a vertical support without interlocking. Placement of a first container 60 on a flat surface 85, or surface having female positioning holes, allows lower support structure 82 to raise the base container off the ground allowing air flow 92 beneath the aeration base 62. If composting is desired of waste having a high moisture content, an impervious barrier can be placed between the base 62 and surface 85, either before or after positioning of the base container. Additional containers can be stacked on top of the base container and coupled thereto by insertion of lower portion 82 of corner support structure 74 into the upper end portion 80 of the base corner support structure 74 for interlocking thereof. Positioning is made possible by use of cranes or, preferably, fork lifts whereby inverted channels 86 are permanently attached to the base 62 allowing fork lift access. The use of a roundtable fork lift, in conjunction with the channels 86, permits ease of emptying container 60 upon the end of the compost cycle by inverting the container.

The distance D1 between the aeration base 62 of a first container and the aeration base 62 of a second or stacked container is designed to provide a composting area of approximately 16 inches. The wall height H is approximately 12 inches allowing a preferred composting depth of 12 inches which has been determined as the optimum depth for composting in a 14 day composting cure cycle 98. Distance D2 between a top edge of a wall and a stacked aeration base of approximately 4 inches has been found to allow adequate air circulation to aeration base 62.

Placement of the modular containers in an indoor composting area 96 is preferred in arid, cold, and/or heavily populated areas. The ventilation in such a processing building is performed by pulling air from the outside and conditioning the air with moisture. For instance, in arid areas moisture added to the air prevents the mixture from drying too quickly. Moisture serves as fuel in the bio-oxidation of organic matter allowing heat buildup to destroy pathogenic microorganisms at temperatures above 55 degrees C. Despite the heat production, in cold areas the air should be treated with warm moisture to prevent the mixture from freezing.

Referring back to FIG. 1, the mixture is placed on a vibrating screen 100 for obtaining compost material of approximately ½ inch. The screened material is then packaged, stored, or otherwise made available for market 102. Over sized material is directed 104 to a shedder 106 and returned 108 to the vibrating screen 100 for further separation or transferred 110 to the junction container 28 for repeat of the composting process.

Figure 8:
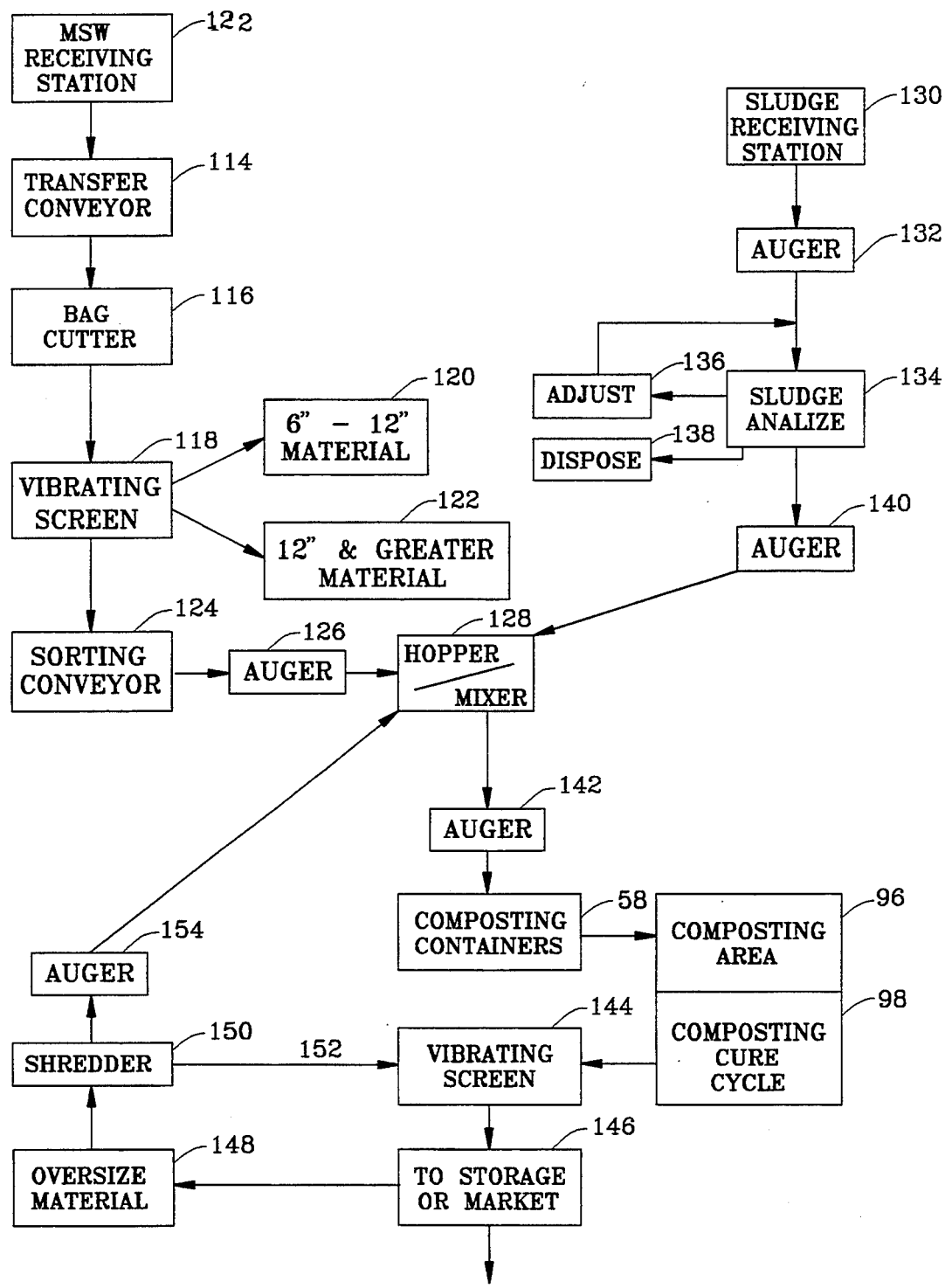
FIG. 8 is a schematic flow chart in accordance with an alternative method of treating waste.
Figure 9:
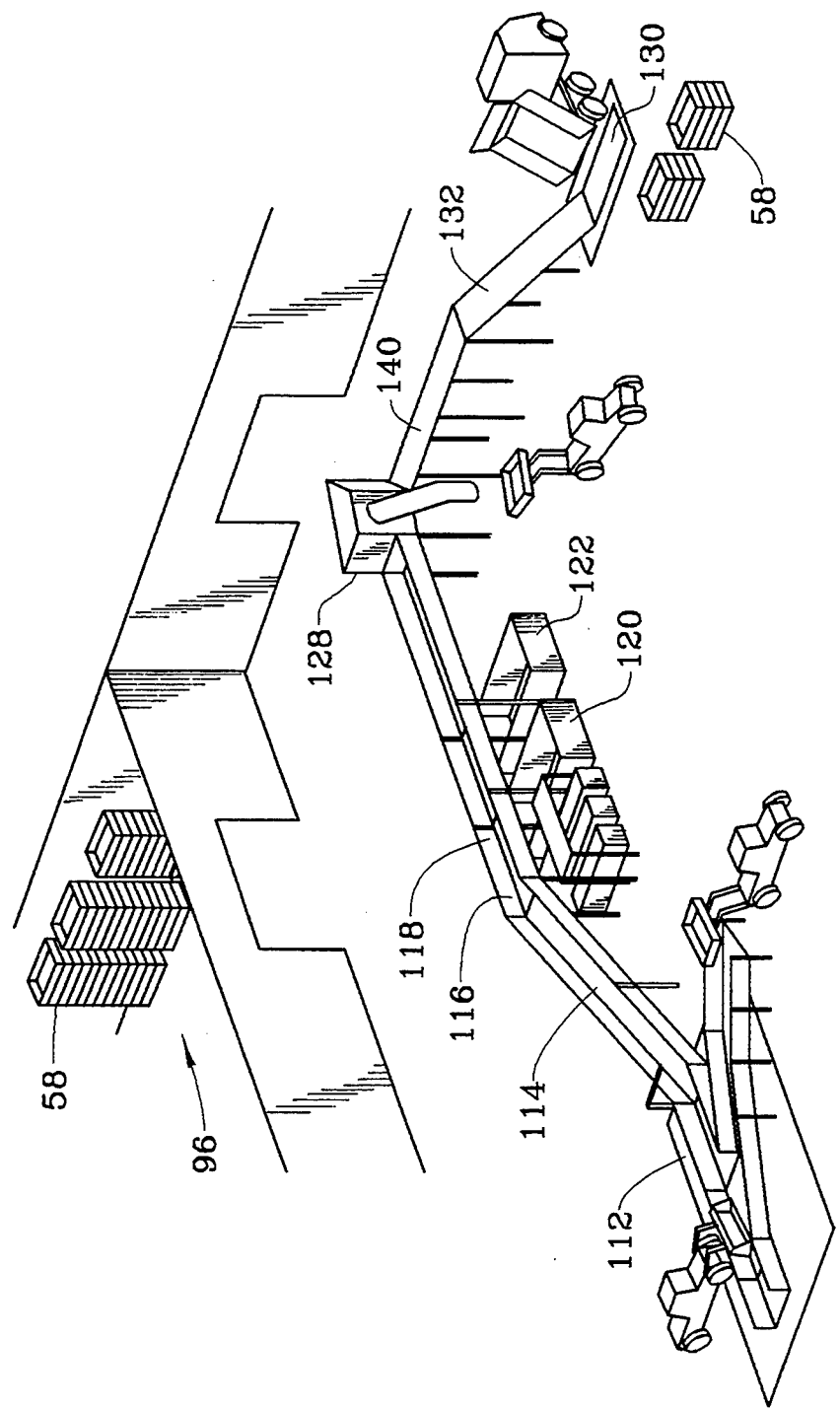
FIG. 9 is a pictorial view of the composting system apparatus as set forth in accordance with reference to FIG. 8.

FIGS. 8 and 9 illustrate an alternative embodiment of the instant invention whereby a conventional receiving station 112 is depicted for receipt of solid municipal waste. Conveyor section 114 carries the waste to a plastic bag cutter 116 for exposing the contents. In this embodiment a vibrating screen 118 is used to separate material 120 greater than 6 inches from the process and/or material 122 greater than 12 inches for shredding or disposal. The remaining waste is transferred to a sorting conveyor 124 for sorting of non-composting material that has been passed through the vibrating screen. After sorting, auger 126 transfers the waste material to hopper/mixer 128.

Similarly, municipal sludge, for example from waste treatment plants, is received in placement station 130 or delivered into a placement station. Auger 132 transfers the sludge during which time the sludge can be analyzed 134 and adjusted 136 for compatibility with the type of compost desired. The waste can be adjusted during transfer or diverted 136 for adjustment or disposal 138. Acceptable sludge is transferred by auger 140 to hopper/mixer 128.

A controlled transfer between auger 126 and 140 allows for a uniform consistency of the waste and auger sections 126, 140, providing mixing during transfer. Hopper/mixer 128 includes a means to thoroughly mix the waste and sludge constituents before transfer 142 to the modular composting container system 58.

The composting container system and process described as to FIGS. 2-7, is incorporated into this embodiment as if fully described herein. After the composting cycle, the mixture is placed on a vibrating screen 144 for obtaining compost material of approximately ½ inch. The screened material is packaged, stored, or otherwise made available for market 146. Over sized material is directed 148 to a shedder 150 and returned 152 to the vibrating screen 144 for further separation or transfer 154 to the hopper/mixer 128 for repeat of the composting process.

It is to be understood that while I have illustrated and described certain examples of practicing my method for composting, it is not to be limited to the specific examples of components utilized in accomplishing the method herein describe and shown. It will be apparent to those skilled in the art that various changes may be made without departing from the scope of the invention and the invention is not to be considered limited to what is shown in the drawings and described in the specification.

What I claim as new and desire to secure by Letters Patent of the United States is:

1. A method for composting municipal solid waste and municipal dewatered sludge, comprising the steps of:
   removing non-compostable matter and recyclable materials from said solid waste;
   adding a predetermined amount of dewatered sludge having a moisture content of less than 60% to a predetermined amount of said solid waste;
   mixing said solid waste and said dewatered sludge into a uniform mixture;
   depositing the mixture in a plurality of self-contained stackable aerobic modular containers, each said container comprised of a base having a length and a width and four rectilinear walls having a height between 12 and 16 inches extending upward therefrom, said base and said walls having a plurality of openings allowing free flow of air therethrough and an open top, said containers spaced apart and operatively associated with similarly stacked containers;

storing said containers in a controlled environment in vertical disposition for approximately 14 days;

removing the mixture from said containers;

screening composted mixture from the container through a vibrating screen separating a portion of the composted mixture into a screened compost mixture and an unscreened compost mixture;

packaging the screened compost mixture for distribution;

shredding said unscreened compost mixture and transferring a portion of said shredded mixture through said vibrating screen for adding to said screened compost mixture; and returning a portion of said unscreened shredded mixture to said solid waste mixing with said solid waste and said dewatered sludge before depositing in said containers for composting.

2. A method for composting municipal solid waste and dried sludge as recited in claim 1 wherein said containers are filled with a controlled mixture depth of approximately 12 inches.

3. A method for composting municipal solid waste and dried sludge as recited in claim 1, wherein said containers include an elevation means for securely supporting at least one container at a fixed elevation above a second container, and a means for positioning said second container in a rigid predetermined position.

4. A method for composting municipal solid waste and dried sludge as recited in claim 1 wherein said sludge is analyzed and adjusted for compatible with the composting process.

5. A method for composting municipal solid waste and dried sludge as recited in claim 4 wherein said sludge found to be non-compatible with the composting process is adjusted for compatible with the composting process.

6. A method for composting municipal solid waste and dried sludge as recited in claim 1 wherein the removing of non-compostable matter is performed by sorting of the municipal solid waste.

7. A method for composting municipal solid waste and dried sludge as recited in claim 1 wherein said modular composting container system includes a means for interlocking of containers.

8. A method for composting municipal solid waste and dried sludge as recited in claim 1 wherein said means to monitor moisture is further defined as an enclosed building with a means for adjusting the moisture content of incoming fresh air and a means for purifying the outgoing air.

9. A method for composting municipal solid waste and dried sludge, comprising: removing non-compostable matter from a supply of solid waste, screening said solid waste for material having a size less than 6 inches, adding a sludge having a moisture content less than 60% to said solid waste, mixing said solid waste and said sludge thoroughly into a consistent mixture, providing a plurality of modular containers having aerated bottoms and at least three aerated sides and an open top, depositing the mixture in said modular container forming a controlled depth of said mixture, stacking said containers in a vertical format under a covered enclosure as to prevent rain from changing the moisture content of said mixture, allowing said mixture to cure for approximately 14 days, removing said mixture from said containers, screening composted material from said mixture, removing the composted material for packaging or bulk distribution, shredding the mixture, screening shredding material so that smaller material is added to composted material, returning remaining mixture to municipal solid waste for revisiting of composting process.

10. A method for composting municipal solid waste and dried sludge as recited in claim 9 and additionally controlling the depth of said moisture from top to bottom, said controlled depth being limited to the depth through which air may circulate through said mixture for which a specified temperature can be controlled and maintained within said mixture.

11. A method for composting municipal solid waste and dried sludge as recited in claim 9, wherein said controlled depth is approximately 12 inches.

12. A method for composting municipal solid waste and dried sludge as recited in claim 9, wherein said modular composting container system is further defined as a plurality of self-contained stackable containers for holding said mixture, said containers each having a rectilinear aeration base defined by a length and a width and lower and upper face surface and four walls disposed along the perimeter and releasably secured perpendicular to said upper face surface of said base, an elevation means for securely supporting at least one container at a fixed elevation above the upper face surface, and a means for releasably coupling the lower face surface of said base to a positioning means.

13. A method for composting municipal solid waste and dried sludge recited in claim 12 wherein the composting depth is between 5 inches and 15 as measured from the upper surface of said aeration base.

* * * * *